(12) United States Patent
Okuma

(10) Patent No.: US 11,740,103 B2
(45) Date of Patent: Aug. 29, 2023

(54) MAP CREATION DEVICE, MAP CREATION SYSTEM, MAP CREATION METHOD, AND STORAGE MEDIUM

(71) Applicant: HONDA MOTOR CO., LTD., Tokyo (JP)

(72) Inventor: Yuki Okuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 17/672,734

(22) Filed: Feb. 16, 2022

(65) Prior Publication Data

US 2022/0307860 A1 Sep. 29, 2022

(30) Foreign Application Priority Data

Mar. 25, 2021 (JP) ................................. 2021-050989

(51) Int. Cl.
*G01S 19/40* (2010.01)
*G01C 21/00* (2006.01)
*G01S 19/48* (2010.01)

(52) U.S. Cl.
CPC ..... *G01C 21/3848* (2020.08); *G01C 21/3807* (2020.08); *G01C 21/387* (2020.08); *G01S 19/40* (2013.01); *G01S 19/485* (2020.05)

(58) Field of Classification Search
CPC .............. G01C 21/3848; G01C 19/485; G01C 21/387; G01C 21/3807; G01S 19/40
See application file for complete search history.

(56) References Cited

FOREIGN PATENT DOCUMENTS

JP 2020-166123 10/2020

*Primary Examiner* — Mathew Franklin Gordon
(74) *Attorney, Agent, or Firm* — Amin, Turocy & Watson, LLP

(57) ABSTRACT

A map creation device includes a processor, and the processor is configured to execute a program to acquire an image captured by a camera mounted in a vehicle, estimate a first position indicating a position of the vehicle and an error of the first position based on information indicating a traveling state of the vehicle, estimate a second position indicating the position of the vehicle and an error of the second position based on radio waves transmitted from artificial satellites, set position information of the vehicle preferentially using one position with a smaller error of the first position and the second position, and create a map of places in which the vehicle has traveled based on the set position information of the vehicle and the image.

12 Claims, 7 Drawing Sheets

MAP CREATION DEVICE, MAP CREATION SYSTEM, MAP CREATION METHOD, AND STORAGE MEDIUM

CROSS-REFERENCE TO RELATED APPLICATION

Priority is claimed on Japanese Patent Application No. 2021-050989, filed Mar. 25, 2021, the content of which is incorporated herein by reference.

BACKGROUND OF THE INVENTION

Field of the Invention

The present invention relates to a map creation device, a map creation system, a map creation method, and a storage medium.

Description of Related Art

In the related art, a technique of creating a road map on the basis of information such as an image of a road captured by an onboard camera is known (for example, see Japanese Unexamined Patent Application, First Publication No. 2020-166123). In this technique, distances between objects on a road and a vehicle are calculated using a plurality of images captured by a binocular camera and a road map is created. A technique of identifying a position of a vehicle at the time of capturing an image using signals received from global navigation satellite system (GNSS) satellites or odometry information calculated on the basis of an output value of an onboard sensor and improving the accuracy of the map is also known.

SUMMARY OF THE INVENTION

In the related art, in order to create a road map with high precision, it is necessary to accurately identify the position of the vehicle at the time of capturing an image. However, according to conditions at the time of capturing an image such as deterioration of a receiving environment with respect to GNSS satellites or error in odometry information, the position of the vehicle may not be accurately identified and thus a problem may occur in the accuracy of the road map. When a binocular camera is used, there is a problem in that a process load or a process time increases with an increase in the number of images to be processed and a cost increases due to use of a binocular camera with a high price.

The present invention was made in consideration of the aforementioned circumstances and an objective thereof is to provide a map creation device, a map creation system, a map creation method, and a storage medium that can create a map with high accuracy.

A map creation device, a map creation system, a map creation method, and a storage medium according to the present invention employ the following configurations.

(1) According to an aspect of the present invention, there is provided a map creation device comprising a processor, the processor being configured to execute a program to: acquire an image captured by a camera mounted in a vehicle; estimate a first position indicating a position of the vehicle and an error of the first position based on information indicating a traveling state of the vehicle; estimate a second position indicating the position of the vehicle and an error of the second position based on radio waves transmitted from artificial satellites; set position information of the vehicle preferentially using one position with a smaller error of the first position and the second position; and create a map of places in which the vehicle has traveled based on the set position information of the vehicle and the image.

(2) In the map creation device according to the aspect of (1), the processor may execute the program to estimate the first position and the error of the first position based on odometry information of the vehicle and to estimate the second position and the error of the second position based on radio waves received from GNSS satellites by the vehicle.

(3) In the map creation device according to the aspect of (2), the processor may execute the program to calculate a covariance matrix using a designed error variance value of a device that acquires the odometry information and to estimate a first error ellipse indicating a range of the error of the first position using the calculated covariance matrix.

(4) In the map creation device according to the aspect of (3), the processor may execute the program to calculate a covariance matrix using a designed error variance value of a device that receives radio waves from the GNSS satellites and to estimate a second error ellipse indicating a range of the error of the second position using the calculated covariance matrix.

(5) In the map creation device according to the aspect of (4), the processor may execute the program to determine one position with a smaller error of the first position and the second position based on a result of comparison between the first error ellipse and the second error ellipse.

(6) In the map creation device according to the aspect of any one of (1) to (5), the processor may execute the program to select one position with a smaller error of the first position and the second position and to set the selected one position as the position information of the vehicle.

(7) In the map creation device according to the aspect of any one of (1) to (5), the processor may execute the program to set a coefficient to increase a weight of one position with a smaller error of the first position and the second position and to set a position acquired by calculating a weighted sum of the first position and the second position as the position information of the vehicle.

(8) In the map creation device according to the aspect of any one of (1) to (7), the processor may execute the program to calculate a moving distance of the vehicle based on time-series change of the position information of the vehicle and to correct a scale of the map created from the image using the calculated moving distance.

(9) In the map creation device according to the aspect of (8), the processor may execute the program to calculate a scale correction coefficient which is a ratio of a moving distance of the vehicle calculated based on point cloud data included in a point cloud map created from the image to a moving distance of the vehicle calculated based on the time-series change of the position information of the vehicle and to correct the scale of the map created form the image using the calculated scale correction coefficient.

(10) According to another aspect of the present invention, there is provided a map creation system including: the map creation device according to the aspect of any one of (1) to (9); the camera; a device configured to acquire information indicating a traveling state of the vehicle; and a device configured to acquire radio waves transmitted from artificial satellites.

(11) According to another aspect of the present invention, there is provided a map creation method that is performed by a computer, the map creation method including: acquiring an image captured by a camera mounted in a vehicle; estimating a first position indicating a position of the vehicle and an error of the first position based on information indicating a traveling state of the vehicle; estimating a second position indicating the position of the vehicle and an error of the second position based on radio waves transmitted from artificial satellites; setting position information of the vehicle preferentially using one position with a smaller error of the first position and the second position; and creating a map of places in which the vehicle has traveled based on the set position information of the vehicle and the image.

(12) According to another aspect of the present invention, there is provided a non-transitory computer-readable storage medium storing a program causing a computer to perform: acquiring an image captured by a camera mounted in a vehicle; estimating a first position indicating a position of the vehicle and an error of the first position based on information indicating a traveling state of the vehicle; estimating a second position indicating the position of the vehicle and an error of the second position based on radio waves transmitted from artificial satellites; setting position information of the vehicle preferentially using one position with a smaller error of the first position and the second position; and creating a map of places in which the vehicle has traveled based on the set position information of the vehicle and the image.

According to the aspects of (1) to (12), by setting the position information of the vehicle preferentially using one position with a smaller error of the first position and the second position and creating a map of places in which the vehicle has traveled on the basis of the set position information of the vehicle and the image, it is possible to create a map with high accuracy.

According to the aspects of (2) to (7), by estimating the error of the first position based on the odometry information of the vehicle, estimating the error of the second position based on radio waves received from the GNSS satellites by the vehicle, and determining one position with a smaller error through comparison therebetween, it is possible to accurately estimate the position of the vehicle.

According to the aspects of (8) and (9), by correcting a scale of the map using the moving distance of the vehicle calculated on the basis of time-series change of the position information of the vehicle, it is possible to create a map with higher accuracy.

DETAILED DESCRIPTION OF THE INVENTION

Hereinafter, a map creation device, a map creation system, a map creation method, and a storage medium according to an embodiment of the present invention will be described with reference to the accompanying drawings.

First Embodiment

[Overall Configuration]

Figure 1:
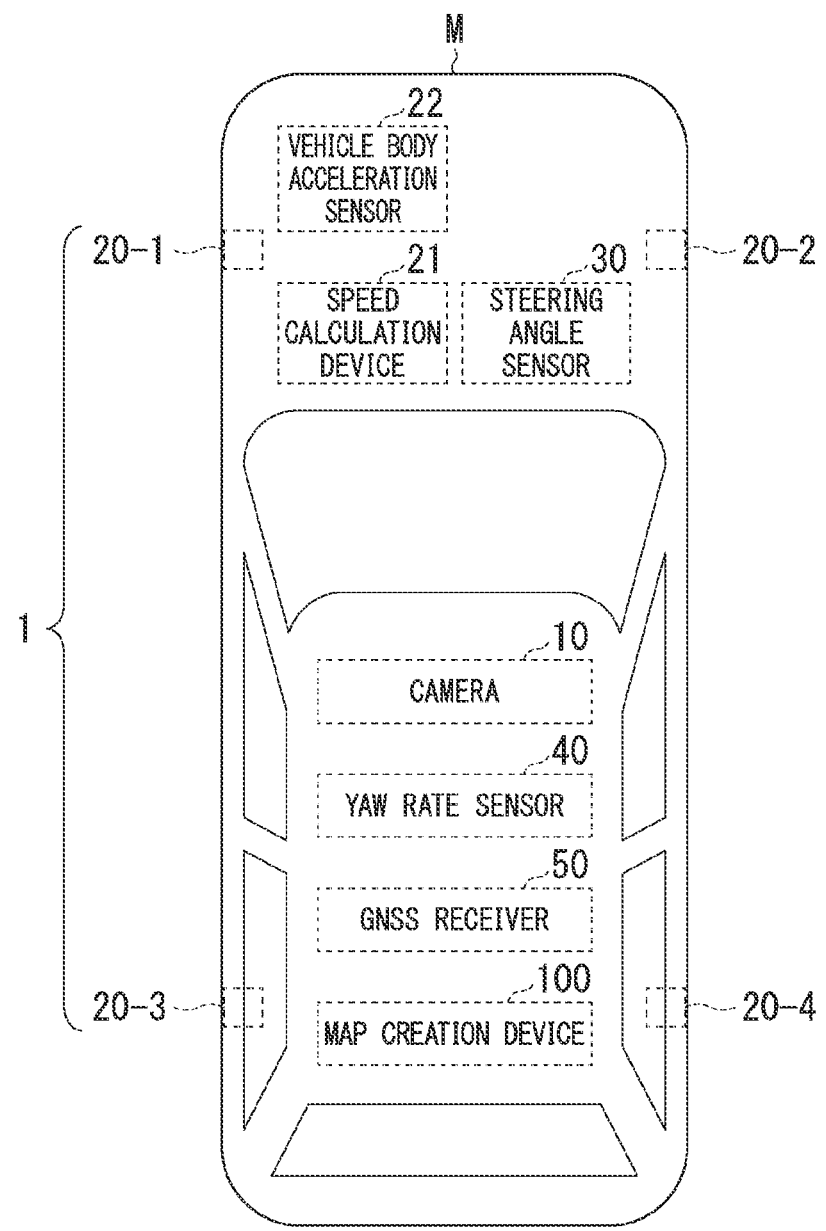
FIG. 1 is a diagram showing an example of a configuration of a map creation system 1 according to a first embodiment.

FIG. 1 is a diagram showing an example of a configuration of a map creation system 1 according to a first embodiment. The map creation system 1 is mounted in a vehicle M. The map creation system 1 includes, for example, a camera 10, wheel speed sensors 20-1 to 20-4 which are an example of a device that acquires odometry information, a speed calculation device 21, a vehicle body acceleration sensor 22, a steering angle sensor 30, a yaw rate sensor 40, a global navigation satellite system (GNSS) receiver 50, and a map creation device 100. The vehicle M may be a vehicle having an automated driving function or may be a vehicle that travels by manual driving. A drive mechanism thereof is not particularly limited, and various types of vehicles such as an engine vehicle, a hybrid vehicle, an electric vehicle, and a fuel-cell vehicle may be employed as the vehicle M. In the following description, the wheel speed sensors are simply referred to as a wheel speed sensor 20 when not distinguished from each other.

The camera 10 is a digital camera employing a solid-state imaging device such as a charge-coupled device (CCD) or a complementary metal oxide semiconductor (CMOS). The camera 10 is attached to an arbitrary position on the vehicle M. When the front view is imaged, the camera 10 is attached to an upper part of a front windshield or a rear surface of a rearview mirror. When the rearview is imaged, the camera 10 is attached to an upper part of a rear windshield, a back door, or the like. When the side view is imaged, the camera 10 is attached to a door mirror or the like. The camera 10 images surroundings of the vehicle M, for example, periodically and repeatedly and acquires a surrounding image. The camera 10 is, for example, a monocular camera or a binocular camera (a stereo camera). In the following description, it is assumed that the camera 10 is a monocular camera and a map is created using a monocular camera simultaneous localization and mapping (SLAM).

Odometry information is a result of estimation of a position and a posture of a mobile object based on an output value from a device (for example, a sensor) attached to the mobile object to measure behavior of the mobile object. When the mobile object is a vehicle, the wheel speed sensor 20 that measures a speed of a vehicle wheel, some or all of the speed calculation device 21 that calculate a vehicle speed on the basis of an output of the wheel speed sensor 20, the vehicle body acceleration sensor 22, the steering angle sensor 30 that detects an operation angle of a steering wheel (or an angle of a steering mechanism), and the yaw rate sensor 40 that detects a rotation speed around a vertical axis generated in the vehicle, other sensors similar thereto, or the like correspond to the "sensor." A sensor that detects the rotation angle of a transmission or a travel motor may be used as the sensor that acquires a speed.

The wheel speed sensor 20 is attached to each wheel of the vehicle M. The wheel speed sensor 20 outputs a pulse signal whenever the wheel rotates by a predetermined angle. The speed calculation device 21 calculates a speed of each wheel by counting the pulse signal input from the corresponding wheel speed sensor 20. The speed calculation device 21 calculates the speed of the vehicle M by averaging speeds of, for example, driven wheels out of the speeds of the wheels.

The vehicle body acceleration sensor 22 is an inertial measurement unit (IMU) of five axes or six axes and serves to detect angular velocities of three axes (a roll axis, a pitch axis, and a yaw axis) in a vehicle body of the vehicle M and to additionally estimate an angle and an acceleration from the result of detection.

The GNSS receiver 50 identifies a position of the vehicle M on the basis of signals received from GNSS satellites (radio waves transmitted from artificial satellites).

The map creation device 100 crates a map of a road through the vehicle M has passed on the basis of a surrounding image of the vehicle M captured by the camera 10. The map is, for example, a point cloud map in which a road is expressed by two-dimensional or three-dimensional point cloud data. The point cloud data is two-dimensional or three-dimensional data indicating a position of an object near the vehicle M. The point cloud data may include data of a model representing a surface or a three-dimensional object such as a "road surface" or a "guard rail" after recognition of an object has been performed as an object having a span. A point cloud map may be, for example, a bird's-eye view when a road is virtually seen from the sky. The point cloud map may be expressed, for example, by two-dimensional coordinate values (XY axes) or three-dimensional coordinate values (XYZ axes).

Figure 2:
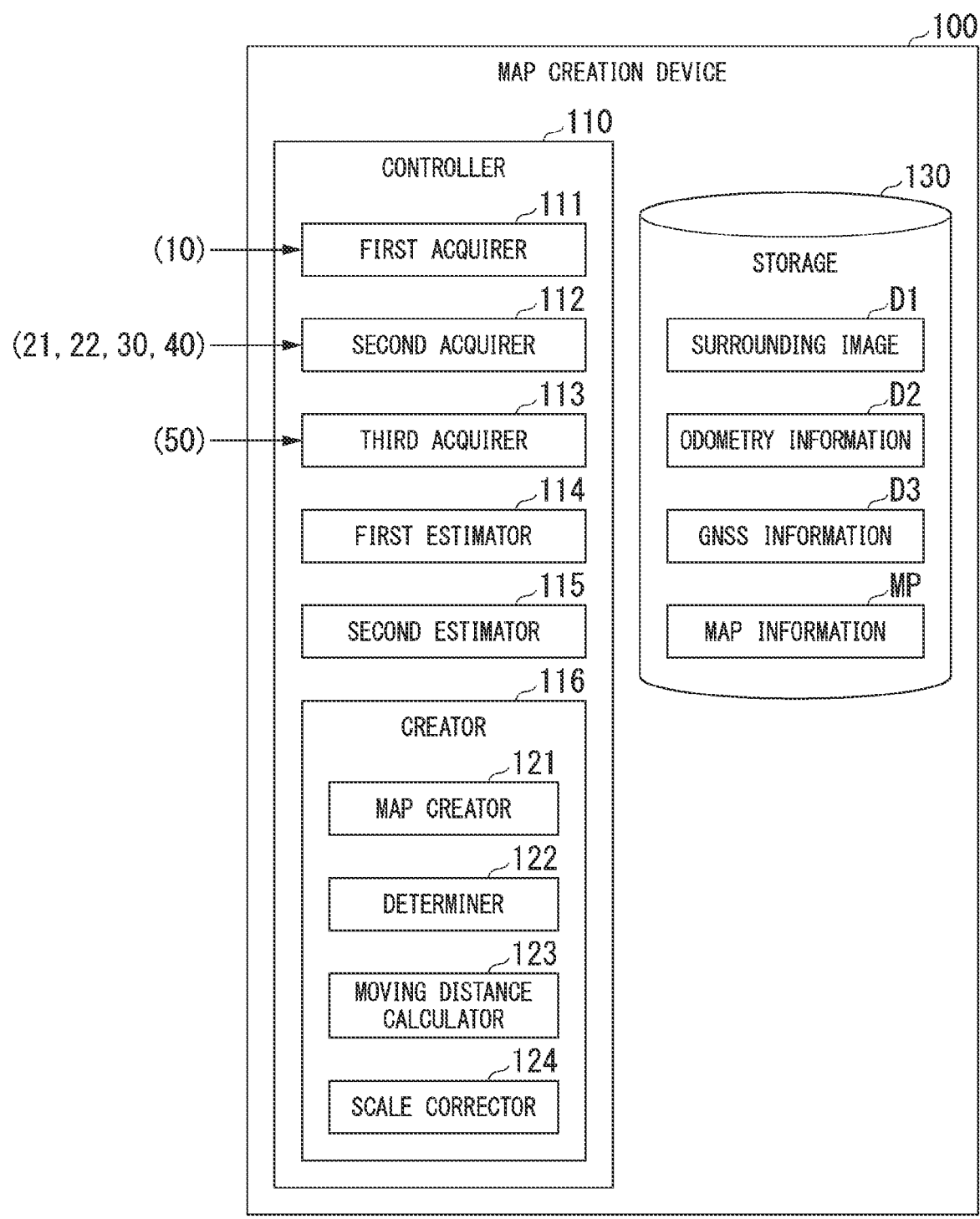
FIG. 2 is a diagram showing an example of a configuration of a map creation device 100 according to the first embodiment.

FIG. 2 is a diagram showing an example of a configuration of the map creation device 100 according to the first embodiment. The map creation device 100 includes, for example, a controller 110 and a storage 130. The controller 110 includes, for example, a first acquirer 111, a second acquirer 112, a third acquirer 113, a first estimator 114, a second estimator 115, and a creator 116. The creator 116 includes, for example, a map creator 121, a determiner 122, a moving distance calculator 123, and a scale corrector 124.

The elements of the controller 110 are realized, for example, by causing a hardware processor (computer) such as a central processing unit (CPU) to execute a program (software). Some or all of such elements may be realized by hardware (which includes circuitry) such as a large scale integration (LSI), an application-specific integrated circuit (ASIC), a field-programmable gate array (FPGA), or a graphics processing unit (GPU) or may be realized in cooperation of software and hardware. The program may be stored in a storage device such as an HDD or a flash memory (a storage device including a non-transitory storage medium) in advance, or may be stored in a removable storage medium (non-transitory storage medium) such as a DVD or a CD-ROM and installed by setting the removable storage medium to a drive device.

The first acquirer 111 acquires a surrounding image from the camera 10 and stores the acquired image as a surrounding image D1 in the storage 130. That is, the first acquirer 111 acquires an image captured by the camera 10 mounted in the vehicle M. The first acquirer 111 is an example of an "acquirer."

The second acquirer 112 acquires output values of the speed calculation device 21, the vehicle body acceleration sensor 22, the steering angle sensor 30, and the yaw rate sensor 40, synthesizes the output values to generate odometry information of the vehicle M, and stores the generated odometry information as odometry information D2 in the storage 130. The odometry information D2 may be information which is expressed as a moving distance with six degrees of freedom or a moving distance of three degrees of freedom including translational moving distances in the X and Y axes and a rotational moving distance centered on the Z axis in practice. Various techniques can be used as a calculation technique of generating the odometry information D2, and, for example, a calculation technique called a unicycle model may be employed. In this calculation technique, for example, the output value of the speed calculation device 21 and the output value of the steering angle sensor 30 are used as input values. Odometry information to be output indicates, for example, a position in the X direction, the position in the Y direction, and the direction of the vehicle M at a certain time.

The third acquirer 113 acquires position information of the vehicle M from the GNSS receiver 50 and stores the acquired position information as GNSS information D3 in the storage 130.

The first estimator 114 estimates a position of the vehicle M (hereinafter also referred to as a "first position") at a certain time on the basis of the odometry information D2. The first estimator 114 estimates an error (hereinafter also referred to as a "first error") which can be included by the first position in addition to the first position. For example, the first estimator 114 calculates a covariance matrix using a designed error variance value of the wheel speed sensor 20, the vehicle body acceleration sensor 22, the steering angle sensor 30, the yaw rate sensor 40, or the like and estimates an error ellipse (an error range) on the basis of the calculated covariance matrix. The covariance matrix is generally equivalent to a matrix which is used for a Kalman filter or the like. The first estimator 114 may calculate the covariance matrix in consideration of a calculation error, a rounding error in calculation, or the like which may be generated when the vehicle M travels in unfixed directions or the like.

That is, the first estimator 114 estimates a first position indicating the position of the vehicle M and an error of the first position on the basis of information indicating a traveling state of the vehicle M. The first estimator 114 is an example of a "first estimator." The output values of the speed calculation device 21, the vehicle body acceleration sensor 22, the steering angle sensor 30, and the yaw rate sensor 40 are an example of "information indicating the traveling state of the vehicle M." The first estimator 114 estimates the first position and the error of the first position on the basis of odometry information of the vehicle M. The first estimator 114 calculates a covariance matrix using a designed error variance value of a device that acquires the odometry information and estimates a first error ellipse indicating a range of the error of the first position using the calculated covariance matrix.

The second estimator 115 estimates a position of the vehicle M (hereinafter also referred to as a "second position") at a certain time on the basis of the GNSS information D3. The second estimator 115 estimates an error (hereinafter also referred to as a "second error") which can be included by the second position in addition to the second position. For example, the second estimator 115 calculates a covariance matrix using a designed error variance value of the GNSS receiver 50 and estimates an error ellipse (an error range) on the basis of the calculated covariance matrix. For example, the second estimator 115 may calculate the covariance matrix in consideration of an error based on a decrease in receiving accuracy due to buildings near a road, weather conditions, or the like.

That is, the second estimator 115 estimates a second position indicating the position of the vehicle M and an error of the second position on the basis of radio waves transmitted from artificial satellites. The second estimator 115 is an example of a "second estimator." The signals transmitted from the GNSS satellites are an example of "radio waves transmitted from artificial satellites." The second estimator 115 estimates the second position and the error of the second position on the basis of radio waves received from GNSS satellites by the vehicle M. The second estimator 115 calculates a covariance matrix using a designed error variance value of a device that receives radio waves from GNSS satellites and estimates a second error ellipse indicating the range of the error of the second position using the calculated covariance matrix.

The map creator 121 creates a map of a road through which the vehicle M has passed on the basis of the surrounding image D1. The map creator 121 creates, for example, a point cloud map. The map creator 121 stores the created map as map information MP in the storage 130. For example, when a point cloud map is created using the surrounding image D1 captured by the camera 10 which is a monocular camera, a distance to an object on a road included in the image cannot be calculated in principle. Accordingly, the unit of distance (a scale) in a point cloud map created using image feature points included in the surrounding image D1 is not determined and thus the scale correcting process needs to be separately performed thereon. Accordingly, the creator 116 performs a scale correcting process on the point cloud map created on the basis of the surrounding image D1 using the determiner 122, the moving distance calculator 123, and the scale corrector 124.

For example, the determiner 122 determines which of the first position estimated by the first estimator 114 and the second position estimated by the second estimator 115 has higher estimation accuracy. For example, the determiner 122 determines which of the first position and the second position has a smaller (or larger) error. For example, the determiner 122 compares a length of a major axis of an error ellipse represented by the first error and a length of a major axis of an error ellipse represented by the second error and determines that the error of the estimated position with a shorter major axis is smaller (that is, that estimation accuracy thereof is higher). The determiner 122 may compare the length of a minor axis of the error ellipse represented by the first error and the length of a minor axis of the error ellipse represented by the second error and may determine that the error of the estimated position with a shorter minor axis is smaller. The determiner 122 may compare the average length of the major axis and the minor axis of the error ellipse represented by the first error and the average length of the major axis and the minor axis of the error ellipse represented by the second error and may determine that the error of the estimated position with a smaller average length is smaller. Alternatively, the determiner 122 may compare the area of the error ellipse represented by the first error and the area of the error ellipse represented by the second error and may determine that the error of the estimated position with a smaller area is smaller.

That is, the creator 116 determines one position with a smaller error of the first position and the second position on the basis of a result of comparison between the first error ellipse and the second error ellipse.

The moving distance calculator 123 compares a current value and a previous value (which may be any previous value) of time-series point cloud data included in the point cloud map and calculates a moving distance of the vehicle M every cycle. One cycle means a period between a start time point and an end time point at which the moving distance of the vehicle M is derived. One cycle is, for example, a period of about 0.1 [sec] to 1 [sec]. For example, when axes of an orthogonal coordinate system supposed by the map creation device 100 are defined as X, Y, and Z axes, the moving distance is a moving distance of six degrees of freedom including a translational moving distance in each of the X, Y, and Z axes and a rotational moving distance centered on each of the X, Y, and Z axes.

The moving distance calculator 123 compares a current value and a previous value (which may be any previous value) of the first position and/or the second position in a time series and calculates a moving distance of the vehicle M every cycle. When the determiner 122 determines that the first position has higher estimation accuracy than the second position, the moving distance calculator 123 preferentially sets the first position as the current value and calculates the moving distance between the current value (the first position) and the previous value (the first position or the second position). On the other hand, when the determiner 122 determines that the second position has higher estimation accuracy than the first position, the moving distance calculator 123 preferentially sets the second position as the current value and calculates the moving distance between the current value (the second position) and the previous value (the first position or the second position). Details of the process which is performed by the moving distance calculator 123 will be described later.

The preferential setting includes both a case in which one estimated position of the first position and the second position is selected and set as the estimated position (position information) of the vehicle M and a case in which a coefficient (a degree of weighting) is set such that one weight become greater, and a weighted sum of the first position and the second position is calculated and set as the estimated position of the vehicle M. For example, the preferential setting of the first position includes both a case in which the first position is selected and set as the estimated position of the vehicle M and a case in which a coefficient is set such that the weight of the first position is greater and the weighted sum of the first position and the second position is calculated and set as the estimated position of the vehicle M. For example, the moving distance calculator 123 sets the weighting coefficient on the basis of the ratio of the second error estimated by the second estimator 115 to the first error estimated by the first estimator 114.

The scale corrector 124 calculates a scale correction coefficient which is used to correct the scale of the point cloud map on the basis of the moving distance calculated by the moving distance calculator 123. The scale corrector 124 corrects the scale of the point cloud map using the calculated scale correction coefficient. The scale correction coefficient is, for example, the ratio of the moving distance calculated on the basis of the first position and/or the second position to the moving distance calculated on the basis of the point cloud map. Details of the process which is performed by the scale corrector 124 will be described later.

That is, the creator 116 sets the position information of the vehicle M preferentially using one position with a smaller error of the first position and the second position and creates a map of places in which the vehicle M has traveled on the basis of the set position information of the vehicle M and the surrounding image. The creator 116 is an example of a "creator." The creator 116 selects one position with a smaller error of the first position and the second position and sets the selected one position as the position information of the vehicle M. The creator 116 sets a coefficient such that the weight of one position with a smaller error of the first position and the second position is greater, and sets a position acquired by calculating the weighted sum of the first position and the second position as the position information of the vehicle.

The creator 116 calculates a moving distance of the vehicle on the basis of time-series change of the position information of the vehicle M and corrects the scale of the map created from the surrounding image using the calculated moving distance. The creator 116 calculates the scale correction coefficient which is the ratio of the moving distance of the vehicle M calculated on the basis of the point cloud data included in the point cloud map created from the surrounding image to the moving distance of the vehicle M calculated on the basis of the time-series change of the position information of the vehicle M, and corrects the scale of the map created from the surrounding image using the calculated scale correction coefficient.

The storage 130 stores, for example, a surrounding image D1, the odometry information D2, the GNSS information D3, and the map information MP. The storage 130 is a storage device such as an HDD, a random-access memory (RAM), or a flash memory.

Figure 3:
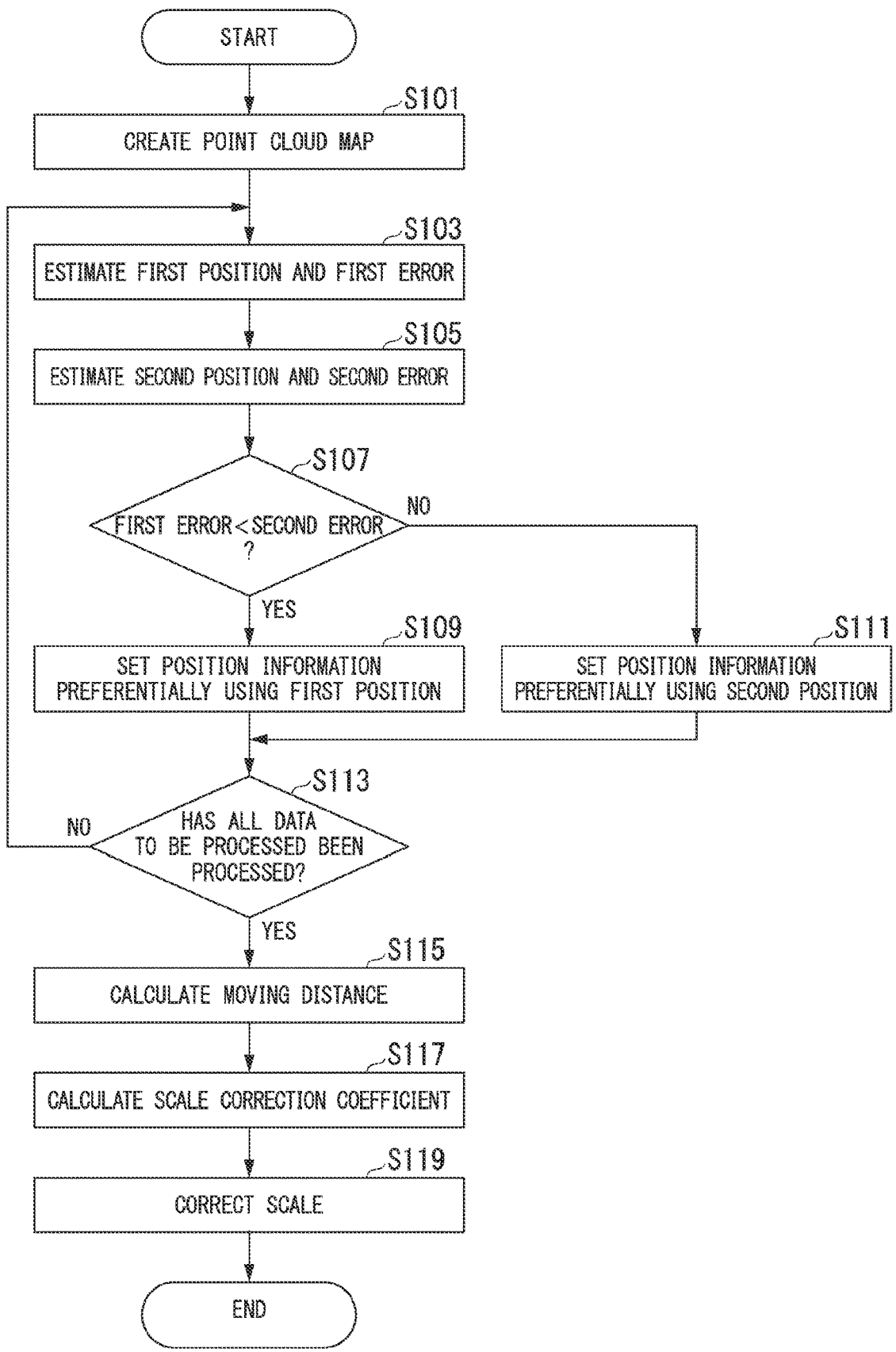
FIG. 3 is a flowchart showing an example of a map creating process which is performed by the map creation device 100 according to the first embodiment.

A map creating process will be described below with reference to a flowchart. FIG. 3 is a flowchart showing an example of a map creating process which is performed by the map creation device 100 according to the first embodiment. In the following description, it is assumed that the vehicle M travels a road for which a map is to be created, and a surrounding image D1, odometry information D2, and GNSS information D3 are acquired and stored in the storage 130 in advance. The map creation device 100 may create a map while the vehicle M is traveling on a road for which a map is to be created. The process steps in the flowchart which will be described below may be exchanged in the order or a plurality of process steps may be performed in parallel.

First, the map creator 121 reads surrounding images D1 captured in a time series from the storage 130 and creates a point cloud map on the basis of the read surrounding images D1 (Step S101). The map creator 121 recognizes, for example, road boundary lines included in the surrounding images D1, the position of an object near the vehicle M, and the like, extracts them as feature points, and creates a point cloud map in which the extracted feature points are expressed as point cloud data.

Figure 4:
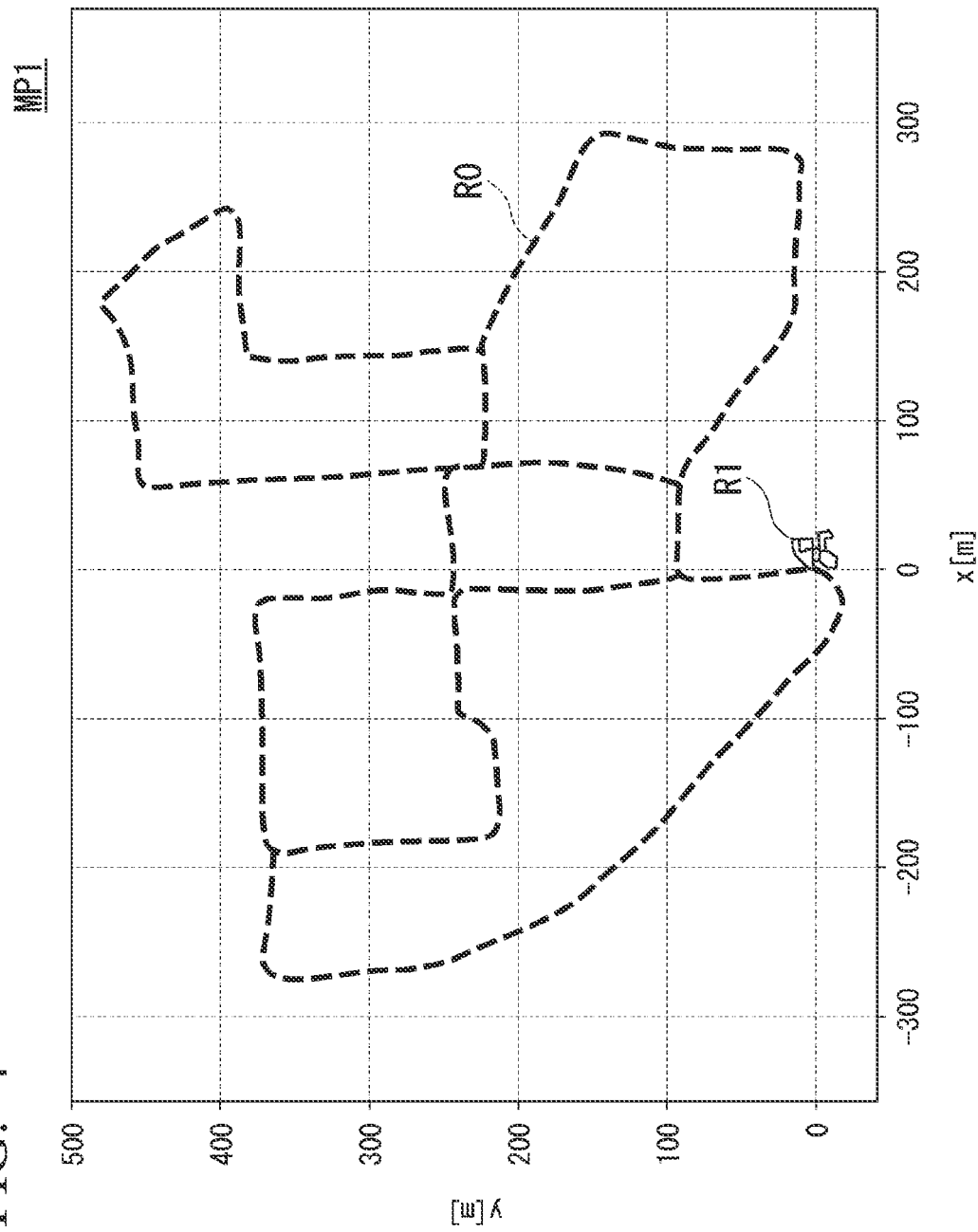
FIG. 4 is a diagram showing an example of a point cloud map MP1 which is created by a map creator 121 according to the first embodiment.

FIG. 4 is a diagram showing an example of a point cloud map MP1 which is created by the map creator 121 according to the first embodiment. In the point cloud map MP1, a road for which a map is to be created (a road R1) is represented as point cloud data. In the point cloud map MP1, a road R0 of which the scale has been determined on the basis of the GNSS information is displayed for the road for which a map is to be created for the purpose of comparison. As shown in FIG. 4, in the point cloud map MP1, a scale of the road R1 has not been determined and an actual scale cannot be ascertained.

Then, the first estimator 114 reads odometry information at a certain time from the odometry information D2 stored in the storage 130 and estimates the first position and the first error (Step S103).

Then, the second estimator 115 reads GNSS information corresponding to the time of the odometry information D2 to be processed in Step S103 out of the GNSS information D3 stored in the storage 130 and estimates the second position and the second error (Step S105).

Then, the determiner 122 compares the second error estimated by the second estimator 115 with the first error estimated by the first estimator 114 and determines whether the first error is smaller than the second error (Step S107).

When it is determined that the first error is smaller than the second error, the determiner 122 sets the position information of the vehicle M preferentially using the first position (Step S109). On the other hand, when it is determined that the first error is not smaller than the second error, the determiner 122 sets the position information of the vehicle M preferentially using the second position (Step S111).

Figure 5:
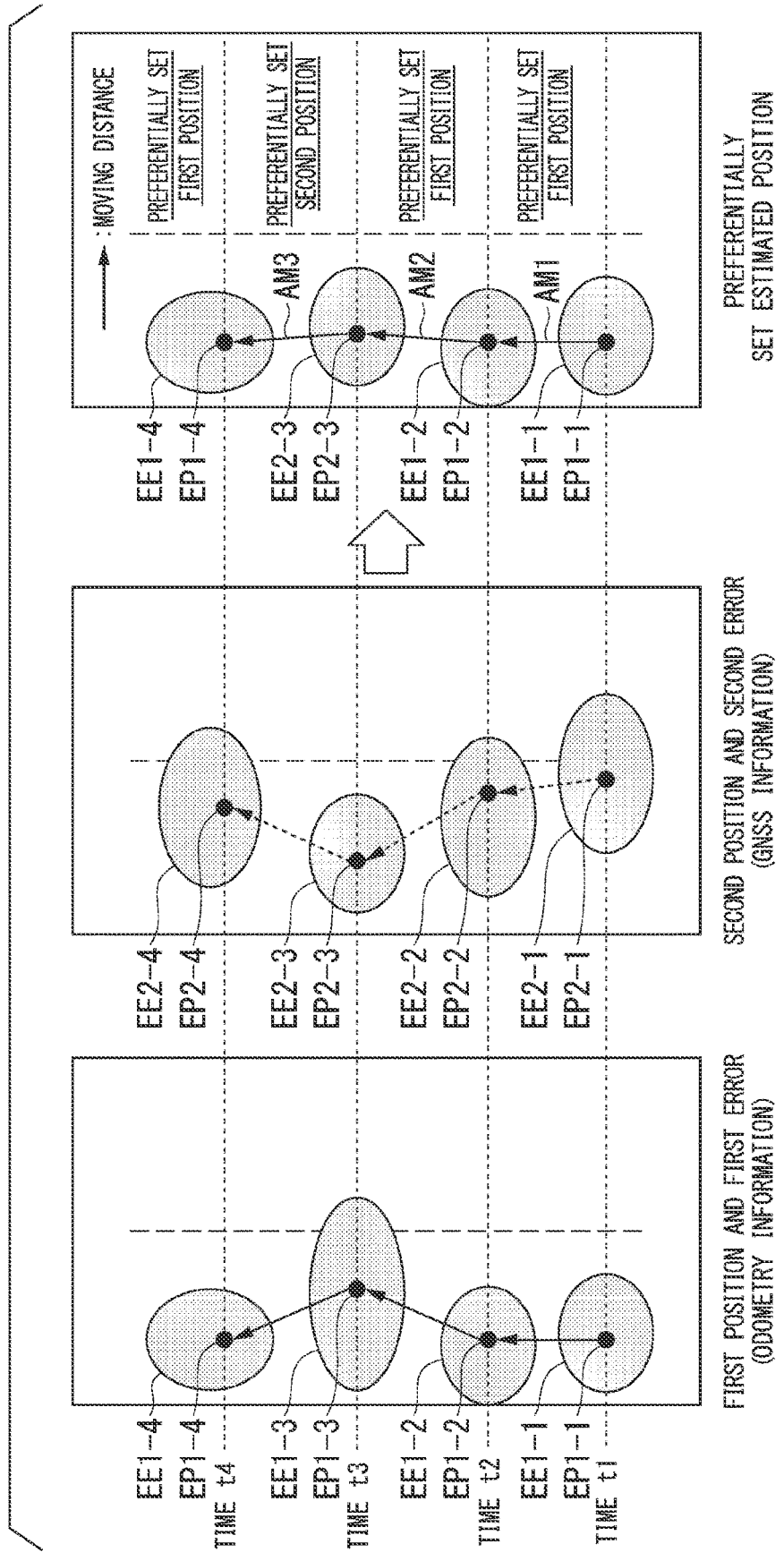
FIG. 5 is a diagram showing an example of a determination process which is performed by a determiner 122 according to the first embodiment.

FIG. 5 is a diagram showing an example of the determination process which is performed by the determiner 122 according to the first embodiment. In the example shown in FIG. 5, at time t1, a first position EP1-1 and a first error EE1-1 are acquired through an estimation process which is performed by the first estimator 114 using the odometry information D2. At time t1, a second position EP2-1 and a second error EE2-1 are acquired through an estimation process which is performed by the second estimator 115 using the GNSS information D3. Here, for example, a length of a major axis of an error ellipse represented by the first error EE1-1 is shorter than a length of a major axis of an error ellipse represented by the second error EE2-1. In this case, the determiner 122 determines that the error of the first position EP1-1 is smaller than the error of the second position EP2-1 at time t1. Accordingly, at time t1, the determiner 122 sets the position information of the vehicle M preferentially using the first position EP1-1.

Similarly, in the example shown in FIG. 5, at time t2, a first position EP1-2 and a first error EE1-2 are acquired through an estimation process which is performed by the first estimator 114 using the odometry information D2. At time t2, a second position EP2-2 and a second error EE2-2 are acquired through an estimation process which is performed by the second estimator 115 using the GNSS information D3. Here, for example, a length of a major axis of an error ellipse represented by the first error EE1-2 is shorter than a length of a major axis of an error ellipse represented by the second error EE2-2. In this case, the determiner 122 determines that the error of the first position EP1-2 is smaller than the error of the second position EP2-2 at time t2. Accordingly, at time t2, the determiner 122 sets the position information of the vehicle M preferentially using the first position EP1-2.

On the other hand, in the example shown in FIG. 5, at time t3, a first position EP1-3 and a first error EE1-3 are acquired through an estimation process which is performed by the first estimator 114 using the odometry information D2. At time t3, a second position EP2-3 and a second error EE2-3 are acquired through an estimation process which is performed by the second estimator 115 using the GNSS information D3. Here, for example, the length of a major axis of an error ellipse represented by the first error EE1-3 is longer than the length of a major axis of an error ellipse represented by the second error EE2-3. In this case, the determiner 122 determines that the error of the first position EP1-3 is larger than the error of the second position EP2-3 at time t3. Accordingly, at time t3, the determiner 122 sets the position information of the vehicle M preferentially using the second position EP2-3.

The first estimator 114 may reset information of a vehicle position (a previous estimated position) which is used for estimation based on the odometry information D2 at a predetermined timing and delete the accumulated errors. For example, at the timing at which the accuracy of the second position based on the GNSS information D3 is determined to be higher such as time t3 in the example shown in FIG. 5, the first estimator 114 may set the second position as a current vehicle position and perform an estimation process based on subsequent odometry information D2.

Then, the determiner 122 determines whether all data to be processed in the odometry information D2 and the GNSS information D3 stored in the storage 130 has been processed (Step S113). When the determiner 122 determines that all data to be processed has not been processed, the routine returns to Step S103, the first estimator 114 reads odometry information at a certain time from non-processed odometry information D2 stored in the storage 130 and estimates the first position and the first error, and the subsequent process steps are repeatedly performed.

On the other hand, when the determiner 122 determines that all data to be processed has been processed, the moving distance calculator 123 calculates a moving distance of the vehicle M between point cloud data based on the point cloud map and calculates a moving distance based on the first position and/or the second position (Step S115). In the example shown in FIG. 5, the moving distance calculator 123 calculates a moving distance AM1 between the first position EP1-1 at time t1 and the first position EP1-2 at time t2. The moving distance calculator 123 calculates a moving distance AM2 between the first position EP1-2 at time t2 and the second position EP2-3 at time t3. The moving distance calculator 123 calculates a moving distance AM3 between the second position EP2-3 at time t3 and the first position EP1-4 at time t4.

Then, the scale corrector 124 calculates the scale correction coefficient on the basis of the moving distance calculated by the moving distance calculator 123 (Step S117). In the example shown in FIG. 5, the scale corrector 124 calculates the ratio of the moving distance AM1 to a moving distance between a point corresponding to time t1 and a point corresponding to time t2 which is calculated from the point cloud map (hereinafter referred to as a "first moving distance") as a scale correction coefficient (hereinafter referred to as a "first scale correction coefficient"). Similarly, the scale corrector 124 calculates the ratio of the moving distance AM2 to a moving distance between a point corresponding to time t2 and a point corresponding to time t3 which is calculated from the point cloud map (hereinafter referred to as a "second moving distance") as a scale correction coefficient (hereinafter referred to as a "second scale correction coefficient"). The scale corrector 124 calculates the ratio of the moving distance AM3 to a moving distance between a point corresponding to time t3 and a point corresponding to time t4 calculated from the point cloud map (hereinafter referred to as a "third moving distance") as a scale correction coefficient (hereinafter referred to as a "third scale correction coefficient").

Then, the scale corrector 124 corrects the scale of the point cloud map using the calculated scale correction coefficient (Step S119). For example, the scale corrector 124 corrects the distance between the point corresponding to time t1 and the point corresponding to time t2 on the point cloud map using the first scale correction coefficient. For example, when the first scale correction coefficient is the ratio of the moving distance AM1 to the first moving distance, the scale corrector 124 performs the correction by multiplying the distance between the point corresponding to time t1 and the point corresponding to time t2 on the point cloud map by the first scale correction coefficient. Similarly, the scale corrector 124 corrects the distance between the point corresponding to time t2 and the point corresponding to time t3 on the point cloud map using the second scale correction coefficient. Similarly, the scale corrector 124 corrects the distance between the point corresponding to time t3 and the point corresponding to time t4 on the point cloud map using the third scale correction coefficient. The scale corrector 124 may calculate one scale correction coefficient for one point cloud map and correct the scale of the point cloud map using the calculated scale correction coefficient. For example, the scale corrector 124 may calculate the average value of a plurality of scale correction coefficients calculated as described above (for example, an average value of the first to third scale correction coefficients) as one scale correction coefficient for one point cloud map.

Figure 6:
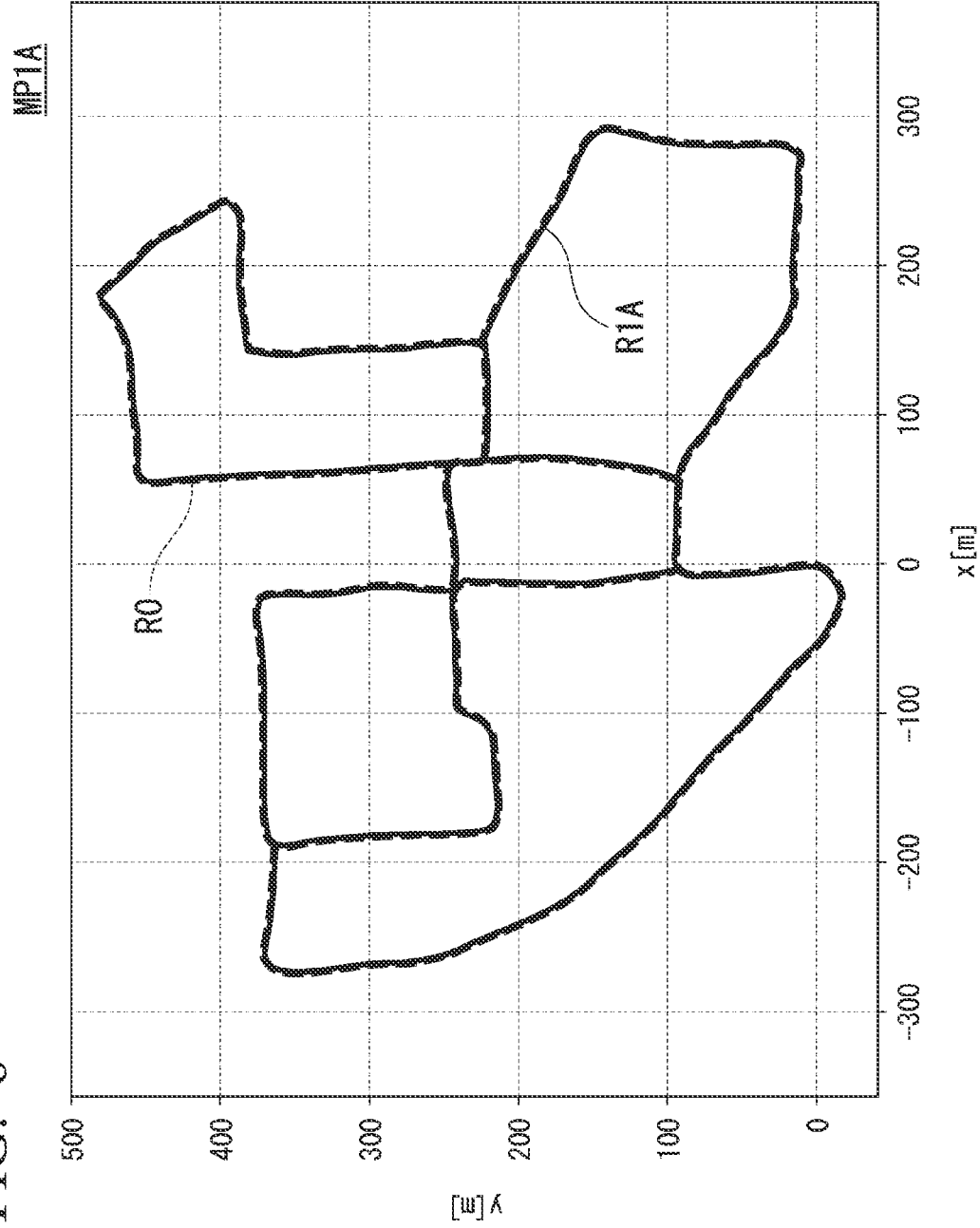
FIG. 6 is a diagram showing an example of a point cloud map MP1A of which scale correction has been performed by a scale corrector 124 according to the first embodiment.

FIG. 6 is a diagram showing an example of a point cloud map MP1A of which the scale has been corrected by the scale corrector 124 according to the first embodiment. In the point cloud map MP1A of which the scale has been corrected and which is shown in FIG. 6, a road R1A which is acquired as a result of scale correction performed on the road R1 appearing in the point cloud map MP1 shown in FIG. 4 is displayed. The road R1A of which the scale has been corrected has almost the same scale and shape as the road R0 which is created on the basis of the GNSS information and which is shown for the purpose of comparison. As described above, the map creation device 100 can create a map with high accuracy by estimating and correcting a scale of a point cloud map. The routine of the flowchart ends in this way.

With the map creation system 1 and the map creation device 100 according to the first embodiment, it is possible to create a map with high accuracy by setting position information of a vehicle M preferentially using one position with a smaller error out of a first position and a second position and creating a map of places in which the vehicle M has traveled on the basis of the set position information of the vehicle M and surrounding images. It is also possible to accurately estimate a position of the vehicle M by estimating an error of the first position based on the odometry information of the vehicle M, estimating an error of the second position based on radio waves received from GNSS satellites by the vehicle M, and determining one position with a smaller error through comparison therebetween. By correcting the scale of the map using the moving distance of the vehicle M which is calculated by time-series change of the position information of the vehicle M, it is possible to create a map with high accuracy, for example, even when surrounding images captured by a monocular camera are used.

Second Embodiment

Figure 7:
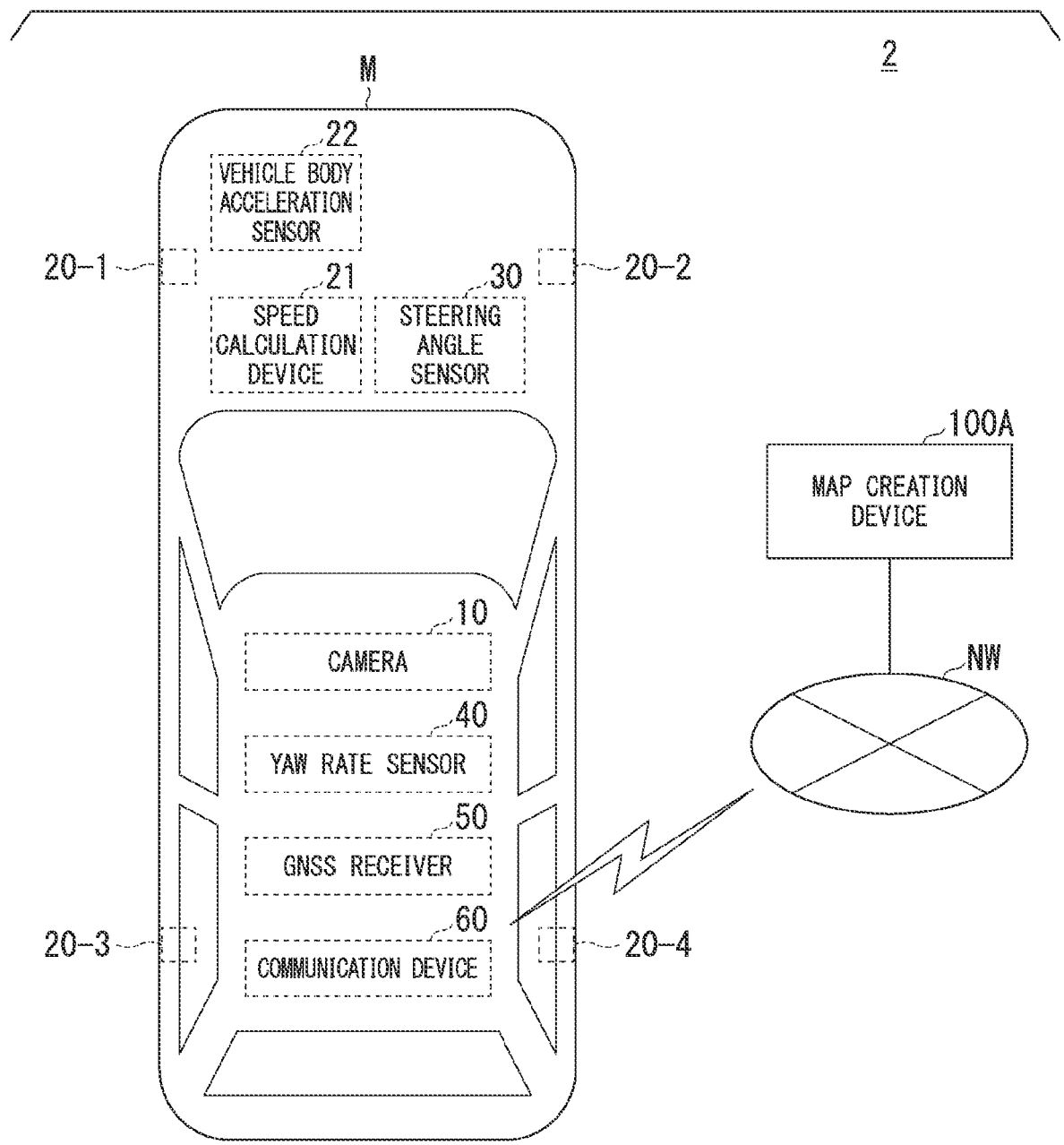
FIG. 7 is a diagram showing an example of a configuration of a map creation system 2 according to a second embodiment.

A second embodiment will be described below. FIG. 7 is a diagram showing an example of a configuration of a map creation system 2 according to the second embodiment. In the map creation system 2, a map creation device 100A is configured as a cloud server instead of a vehicle M. A communication device 60 that processes information from the camera 10, the speed calculation device 21, the vehicle body acceleration sensor 22, the steering angle sensor 30, the yaw rate sensor 40, the GNSS receiver 50, and the like according to necessity and transmits the processed information to the map creation device 100A is mounted in one or more vehicles M. The map creation device 100A acquires information transmitted from the communication device 60 via a network NW. The network NW includes, for example, a wide area network (WAN), a local area network (LAN), a cellular network, a radio base station, and the Internet. The map creation device 100A has the same configuration as in the first embodiment except that a communication interface (not shown) for accessing the network NW is provided (see FIG. 2). Therefore, repeated description of such a configuration will be omitted.

With the map creation system 2 and the map creation device 100A according to the second embodiment, it is possible to create a map with high accuracy similarly to the map creation system 1 according to the first embodiment.

The above-mentioned embodiments can be expressed as follows:

a map creation device including:
a storage device that stores a program; and
a hardware processor,
wherein the hardware processor is configured to execute the program to perform:
acquiring an image captured by a camera mounted in a vehicle;
estimating a first position indicating a position of the vehicle and an error of the first position based on information indicating a traveling state of the vehicle;
estimating a second position indicating the position of the vehicle and an error of the second position based on radio waves transmitted from artificial satellites;
setting position information of the vehicle preferentially using one position with a smaller error out of the first position and the second position; and
creating a map of places in which the vehicle has traveled based on the set position information of the vehicle and the image.

While a mode for carrying out the present invention has been described above with reference to an embodiment, the present invention is not limited to the embodiment and can be embodied in various modifications and replacements without departing from the gist of the present invention.

What is claimed is:

1. A map creation device comprising a processor, the processor being configured to execute a program to:
acquire an image captured by a camera mounted in a vehicle;
estimate a first position indicating a position of the vehicle and an error of the first position based on information indicating a traveling state of the vehicle;
estimate a second position indicating the position of the vehicle and an error of the second position based on radio waves transmitted from artificial satellites;
sett position information of the vehicle preferentially using one position with a smaller error of the first position and the second position; and
create a map of places in which the vehicle has traveled based on the set position information of the vehicle and the image.

2. The map creation device according to claim 1, wherein the processor executes the program to:
estimate the first position and the error of the first position based on odometry information of the vehicle; and
estimate the second position and the error of the second position based on radio waves received from GNSS satellites by the vehicle.

3. The map creation device according to claim 2, wherein the processor executes the program to:
calculate a covariance matrix using a designed error variance value of a device that acquires the odometry information; and
estimate a first error ellipse indicating a range of the error of the first position using the calculated covariance matrix.

4. The map creation device according to claim 3, wherein the processor executes the program to:
calculate a covariance matrix using a designed error variance value of a device that receives radio waves from the GNSS satellites; and
estimate a second error ellipse indicating a range of the error of the second position using the calculated covariance matrix.

5. The map creation device according to claim 4, wherein the processor executes the program to determine one position with a smaller error of the first position and the second position based on a result of comparison between the first error ellipse and the second error ellipse.

6. The map creation device according to claim 1, wherein the processor executes the program to:
select one position with a smaller error of the first position and the second position; and
set the selected one position as the position information of the vehicle.

7. The map creation device according to claim 1, wherein the processor executes the program to:
set a coefficient to increase a weight of one position with a smaller error of the first position and the second position; and
set a position acquired by calculating a weighted sum of the first position and the second position as the position information of the vehicle.

8. The map creation device according to claim 1, wherein the processor executes the program to:
calculate a moving distance of the vehicle based on time-series change of the position information of the vehicle; and
correct a scale of the map created from the image using the calculated moving distance.

9. The map creation device according to claim 8, wherein the processor executes the program to:
calculate a scale correction coefficient which is a ratio of a moving distance of the vehicle calculated based on point cloud data included in a point cloud map created from the image to a moving distance of the vehicle calculated based on the time-series change of the position information of the vehicle; and
correct the scale of the map created form the image using the calculated scale correction coefficient.

10. A map creation system comprising:
the map creation device according to claim 1;
the camera;
a device configured to acquire information indicating a traveling state of the vehicle; and
a device configured to acquire radio waves transmitted from artificial satellites.

11. A map creation method that is performed by a computer, the map creation method comprising:
acquiring an image captured by a camera mounted in a vehicle;
estimating a first position indicating a position of the vehicle and an error of the first position based on information indicating a traveling state of the vehicle;
estimating a second position indicating the position of the vehicle and an error of the second position based on radio waves transmitted from artificial satellites;

setting position information of the vehicle preferentially using one position with a smaller error of the first position and the second position; and creating a map of places in which the vehicle has traveled based on the set position information of the vehicle and the image.

12. A non-transitory computer-readable storage medium storing a program causing a computer to perform:

acquiring an image captured by a camera mounted in a vehicle;

estimating a first position indicating a position of the vehicle and an error of the first position based on information indicating a traveling state of the vehicle;

estimating a second position indicating the position of the vehicle and an error of the second position based on radio waves transmitted from artificial satellites;

setting position information of the vehicle preferentially using one position with a smaller error of the first position and the second position; and creating a map of places in which the vehicle has traveled based on the set position information of the vehicle and the image.

* * * * *